(12) United States Patent
Ogawa

(10) Patent No.: US 6,699,192 B2
(45) Date of Patent: Mar. 2, 2004

(54) ULTRASONIC RECEIVING APPARATUS AND ULTRASONIC IMAGING APPARATUS

(75) Inventor: Eiji Ogawa, Kaisei-machi (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/388,458

(22) Filed: Mar. 17, 2003

(65) Prior Publication Data

US 2003/0181802 A1 Sep. 25, 2003

(30) Foreign Application Priority Data

Mar. 19, 2002 (JP) .................................... 2002-075510

(51) Int. Cl.⁷ ................................................ A61B 8/00
(52) U.S. Cl. ....................................................... 600/437
(58) Field of Search ................................ 600/407–480, 600/104, 109; 73/625, 626; 348/65; 378/117; 382/118, 199

(56) References Cited

U.S. PATENT DOCUMENTS 4,674,515 A * 6/1987 Andou et al. ............... 600/463
6,612,981 B2 * 9/2003 Onishi et al. ............... 600/118

OTHER PUBLICATIONS

Nobuaki Takahashi, et al./Under Water Acoustic Sensor With Fiber/Bragg Grating/Optical Review vol. 4, No. 6 (1997).
Yatsuto Uno, et al./Fabrication and Performance of a Fiber Optic Microprobe for Megahertz Ultrasonic Field Measurements/T. IEE Japan, vol. 118–E, No. 11, 1998.
Paul C. Beard, et al./Transduction Mechanisms of the Fabry–Perot Polymer Film Sensing Concept for Wideband Ultrasound Detection.

* cited by examiner

Primary Examiner—Ali M. Imam
(74) Attorney, Agent, or Firm—Sughrue Mion, PLLC

(57) ABSTRACT

In a photo-detection type ultrasonic receiving apparatus, the image quality of ultrasonic image has been enhanced by reducing multiple reflection of the ultrasonic wave. The ultrasonic receiving apparatus according to the present invention includes an ultrasonic detecting element for modulating light on the basis of a received ultrasonic wave, a backing portion directly or indirectly connected to the ultrasonic detecting element propagating the ultrasonic wave to be applied to the ultrasonic detecting element, the backing portion having optical transmissibility and guiding the light used for detecting ultrasonic wave, and a photoelectric conversion unit that detects the light output from the ultrasonic detecting element.

19 Claims, 16 Drawing Sheets

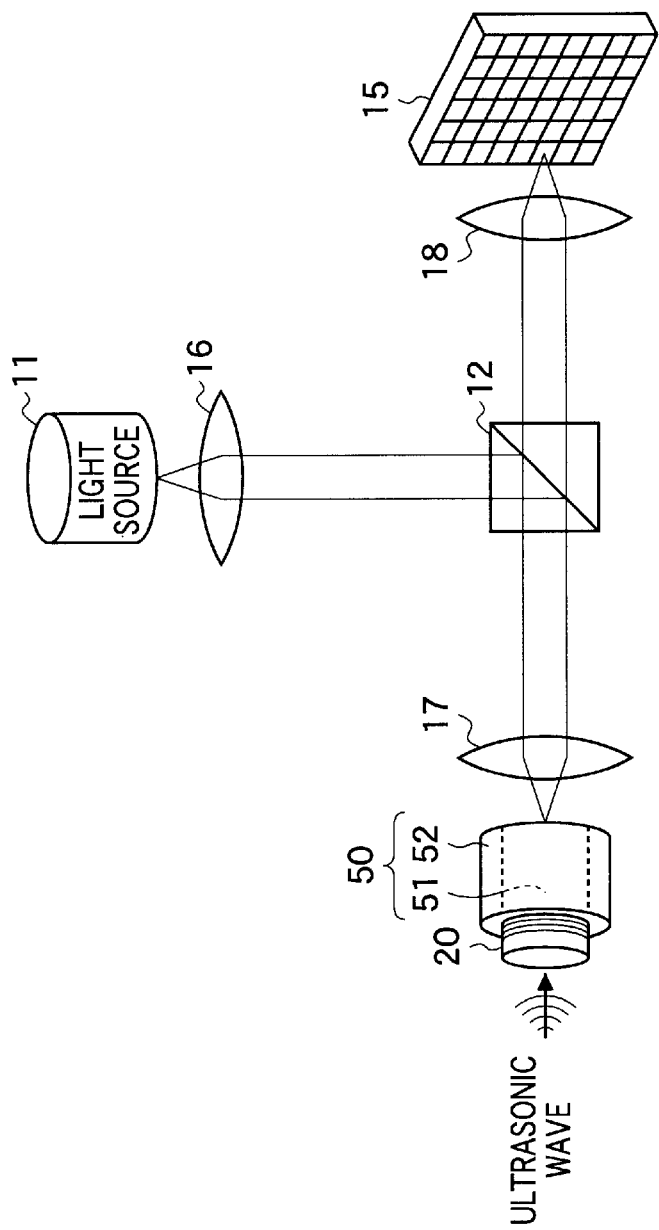

ULTRASONIC RECEIVING APPARATUS AND ULTRASONIC IMAGING APPARATUS

BACKGROUND OF THE INVENTION

1. Field of the Invention

The present invention relates to an ultrasonic receiving apparatus for receiving ultrasonic waves, and further to an ultrasonic imaging apparatus to be used for medical diagnosis or nondestructive inspection by receiving ultrasonic waves using such an ultrasonic receiving apparatus.

2. Description of a Related Art

Conventionally, in an ultrasonic imaging apparatus, generally a one-dimensional sensor array using a piezoelectric element including a piezoelectric ceramic represented by PZT (Pb (lead) zirconate titanate) or a macromolecule piezoelectric element such as PVDF (polyvinyl difluoride) has been used as an element (vibrator) for transmitting and receiving ultrasonic waves. Two-dimensional images in plural cross sections of an object to be inspected are obtained while mechanically shifting a one-dimensional sensor array as described above, and further, by synthesizing these two-dimensional images, a three-dimensional image is obtained.

However, according to this technique, since a time lag is generated in the shifting direction of the one-dimensional sensor array, cross-sectional images at different time points are synthesized resulting in a blurred synthesized image. Accordingly, the technique is not suitable to such a case where images of a living organism as an object are taken in ultrasonic echo observation or the like.

In order to obtain high quality three-dimensional images using ultrasonic waves, a two-dimensional sensor capable of obtaining two-dimensional images without shifting the sensor array is required.

However, although minute processing on elements and wiring to a number of minute elements are required in the case where the two-dimensional sensor array is manufactured using the above-described PZT or PVDF, further miniaturization and integration of elements exceeding the state of the art are difficult. Also, even when the above-described problems are solved, such problems still remain that the cross talk between elements is increased, the SN-ratio is lowered due to increase of electrical impedance caused from minute wirings, electrodes of minute elements get damaged easily, and so on. Therefore, it is difficult to achieve the two-dimensional sensor array using the PZT or the PVDF.

On the other hand, another type of sensor is also known, in which received ultrasonic wave signal is converted into an optical signal and then detected. As for a photo-detection type ultrasonic sensor, a sensor in which a fiber Bragg grating (abbreviated as FBG) is used (see TAKAHASHI et al., National Defense Academy "Underwater Acoustic Sensor with Fiber Bragg Grating", OPTICAL REVIEW Vol. 4, No. 6 (1997) p. 691–694), and a sensor in which a Fabry-Perot resonator (abbreviated as FPR) structure is used (see UNO et al., Tokyo Institute of Technology "Fabrication and Performance of a Fiber Optic Micro-Probe for Megahertz Ultrasonic Field Measurement", T.IEE Japan, Vol. 118-E, No. 11, '98) are reported. When a two-dimensional sensor array is manufactured by using an ultrasonic sensor as described above, the following advantages can be obtained, that is, electrical wiring to a number of minute elements is not required and satisfactory sensitivity is obtained.

Further, a photo-detection type ultrasonic sensor having a two-dimensional detection surface is also known. For example, Beard et al., University College London "Transduction Mechanisms of the Fabry-Perot Polymer Film Sensing Concept for Wideband Ultrasound Detection", IEEE TRANSACTIONS ON ULTRASONICS, FERROELECTRICS, AND FREQUENCY CONTROL, VOL. 46, NO. 6, NOVEMBER 1999 discloses that a polymer film having a Fabry-Perot structure is used for detecting ultrasonic waves. In a film-like ultrasonic sensor as described above, the cost can be reduced since processing on a number of minute elements is not required.

However, the photo-detection type ultrasonic sensor has the following problem, that is, multiple reflection of an ultrasonic wave is generated on a backside of the ultrasonic wave receiving surface.

Herein, taking a photo-detection type two-dimensional plane sensor as an example, the multiple reflection of an ultrasonic wave will be explained. As shown in FIG. 15, an ultrasonic detecting element 100 includes a substrate 101 and an ultrasonic sensing portion 102. In this example, the ultrasonic sensing portion 102 has a Fabry-Perot resonator structure including a total reflection mirror 103, a half mirror 104 and a cavity 105 being formed between the total reflection mirror 103 and the half mirror 104. The member forming the cavity 105 is subjected to a geometrical displacement by being applied with an ultrasonic wave.

While allowing light to enter into the ultrasonic detecting element 100 from the substrate 101 side, an ultrasonic wave is applied to a receiving surface 102a of the ultrasonic detecting element 100. Then, owing to the acoustic pressure changes of the ultrasonic wave, the optical path length L of the cavity 105 changes in accordance with the position of the receiving surface 102a, and the light intensity reflected from the ultrasonic sensing portion 102 changes corresponding to the position thereof. By converting the intensity of the reflected light into the intensity of the ultrasonic wave, the intensity of the ultrasonic wave, which corresponds to the position of the receiving surface 102a, can be detected.

Referring to FIGS. 16 and 17A, the ultrasonic wave propagating from medium and containing information concerning an object to be inspected generates vibration at a point A, and propagates into the inside of the ultrasonic detecting element 100 (ultrasonic wave US1). Then, the ultrasonic wave US1 is reflected at a point B of an interface on the opposite side of receiving surface 102a. At this moment, the ultrasonic wave US1 generates vibration at the point B and returns toward the direction of the receiving surface 102a (ultrasonic wave US2). Further, the ultrasonic wave US2 is reflected at the receiving surface 102a. At this moment, the ultrasonic wave US2 generates vibration at a point C and propagates again to the rear surface of the receiving surface 102a (ultrasonic wave US3). Thus, in the ultrasonic detecting element 100, the reflection is repeated until the propagated ultrasonic wave fades away. Owing to this phenomenon, as shown in FIG. 17B, the signal from the ultrasonic detecting element 100 is mixed with signals generated through the multiple reflection (detection signals at the points C and E) in addition to the signal concerning the object to be inspected (a detection signal at the point A) that is to be normally detected.

The above described multiple reflection of the ultrasonic wave becomes a cause to decrease the SN-ratio in the ultrasonic image, resulting in a decreased image quality. Accordingly, for example, in an ultrasonic receiving apparatus that uses piezoelectric element for transmitting and receiving ultrasonic waves, the ultrasonic wave is attenuated by connecting a backing material including a ferrite core or the like to a piezoelectric element. However, in the photo-detection type ultrasonic receiving apparatus, since it is necessary to take the optical transmissibility into consideration, the backing material same as that of conventional manner can not be used.

SUMMERY OF THE INVENTION

The present invention has been achieved in view of the above-described problems. An object of the present invention is, in a photo-detection type ultrasonic receiving apparatus, to increase the quality of the ultrasonic image by reducing the multiple reflection of the ultrasonic wave. A further object of the present invention is to provide an ultrasonic imaging apparatus to be used for medical diagnosis or nondestructive inspection by receiving ultrasonic waves using such an ultrasonic receiving apparatus.

In order to solve the above-described problems, an ultrasonic receiving apparatus according to a first aspect of the present invention comprises an ultrasonic detecting element for modulating light on the basis of a received ultrasonic wave; a backing portion, directly or indirectly connected to the ultrasonic detecting element, for propagating the ultrasonic wave received by the ultrasonic detecting element, the backing portion having optical transmissibility and guiding the light used for detecting the ultrasonic wave; and a photoelectric conversion unit for detecting the light output from the ultrasonic detecting element.

Further, an ultrasonic receiving apparatus according to a second aspect of the present invention comprises an ultrasonic detecting element including an ultrasonic sensing portion which is expanded and contracted by a received ultrasonic wave to change an optical reflectance in accordance with expansion and contraction thereby performing intensity modulation of incident light; an optical transmission path for guiding the light to the ultrasonic detecting element and propagating the ultrasonic wave received by the ultrasonic detecting element; a collimating portion for collimating the light guided by the optical transmission path with respect to the ultrasonic detecting element; and a photoelectric conversion unit for detecting the light reflected from the ultrasonic detecting element.

An ultrasonic imaging apparatus according to a first aspect of the present invention comprises an ultrasonic transmitting unit for transmitting an ultrasonic wave in accordance with a drive signal; a drive signal generating circuit for generating the drive signal to be applied to the ultrasonic transmitting unit; an ultrasonic detecting element for modulating light on the basis of a received ultrasonic wave; a backing portion, directly or indirectly connected to the ultrasonic detecting element, for propagating the ultrasonic wave received by the ultrasonic detecting element, the backing portion having optical transmissibility and guiding the light used for detecting the ultrasonic wave; and a photoelectric conversion unit for detecting the light output from the ultrasonic detecting element.

Further, an ultrasonic imaging apparatus according to a second aspect of the present invention comprises an ultrasonic transmitting unit for transmitting an ultrasonic wave in accordance with a drive signal; a drive signal generating circuit for generating the drive signal to be applied to the ultrasonic transmitting unit; an ultrasonic detecting element including an ultrasonic sensing portion which is expanded and contracted by a received ultrasonic wave to change an optical reflectance in accordance with expansion and contraction thereby performing intensity modulation of incident light; an optical transmission path for guiding the light to the ultrasonic detecting element and propagating the ultrasonic wave received by the ultrasonic detecting element; a collimating portion for collimating the light guided by the optical transmission path with respect to the ultrasonic detecting element; and a photoelectric conversion unit for detecting the light reflected from the ultrasonic detecting element.

According to the first aspect of the present invention, since the ultrasonic wave is attenuated by propagating the received ultrasonic wave to the backing portion, it is possible to avoid the influence due to the multiple reflection of the ultrasonic wave. Also, since the light used for detection is guided by the backing portion having an optical transmissibility, it is possible to reduce the attenuation of the optical signal output from the ultrasonic detecting element and to guide the optical signal to the photoelectric conversion unit without decreasing the SN-ratio.

According to the second aspect of the present invention, it is possible to avoid the influence due to the multiple reflection of the ultrasonic wave by propagating the received ultrasonic wave to the optical transmission path for guiding the light to the ultrasonic detecting element. Also, since the ultrasonic detecting element and the optical transmission path are connected via collimating portion, it is possible to guide the parallel light to the ultrasonic detecting element and to propagate the ultrasonic wave to the optical transmission path such as an optical fiber.

BRIEF DESCRIPTION OF THE DRAWINGS

FIG. 6 is a diagram showing an ultrasonic receiving apparatus according to a third embodiment of the present invention;

DESCRIPTION OF THE PREFERRED EMBPDIMENTS

Figure 1:
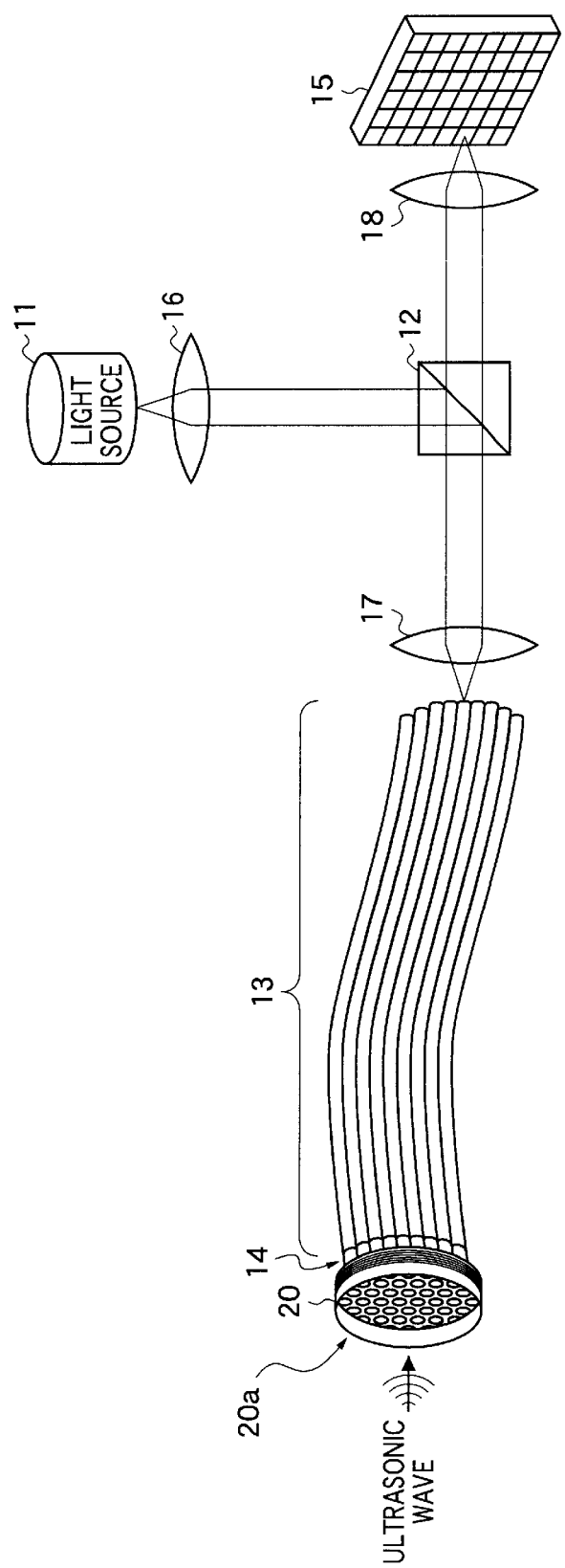
FIG. 1 is a diagram showing a constitution of an ultrasonic receiving apparatus according to a first embodiment of the present invention.

Now, referring to the drawings, embodiments of the present invention will be described in detail. The same component elements will be given with the same reference numerals and the descriptions thereof will be omitted.

FIG. 1 is a diagram showing ultrasonic receiving apparatus according to a first embodiment of the present invention. The ultrasonic receiving apparatus comprises a light source 11, a beam separator 12, an optical transmission path 13, a collimating portion 14, an ultrasonic detecting element 20 for modulating light on the basis of a received ultrasonic wave, a photodetector 15, and focussing systems 16–18.

As for the light source 11, a tunable LD (laser diode) having a predetermined band (for example, 1.55 µm) is used. The beam separator 12 comprises a half mirror, a light circulator, a polarizing beam splitter and so on. The beam separator 12 reflects incident light, which enters from a first direction, to a second direction, and allows the reflected light returned from the second direction to pass through to a third direction which is different from the first direction. In the first embodiment, a half mirror is used as the beam separator 12. The half mirror reflects the incident light in a direction substantially perpendicular to an incident direction, and transmits the light returned from the direction substantially perpendicular to the incident direction. In the first embodiment, disposed in the front and rear points of the half mirror are lenses as focussing systems 16–18.

The optical transmission path 13 guides the light, which has passed through the beam separator 12, to the ultrasonic detecting element 20. As for the optical transmission path 13, a bundle fiber, in which a number of optical fibers (for example, 1024 fibers) are bundled, is used. In the first embodiment, a number of fibers are bundled into a configuration in accordance with a form of a receiving surface of the ultrasonic detecting element (for example, a circular configuration).

The front end of the optical transmission path 13 is connected to the ultrasonic detecting element 20 via the collimating portion 14 with the optical axes thereof aligned with each other. The collimating portion 14 includes, for example, a collimator lens array in which a plurality of collimator lenses are arrayed. The constitution of the optical transmission path 13 and the collimating portion 14 will be described in detail later.

The ultrasonic detecting element 20 has a two-dimensional receiving surface 20a, which is distorted by propagating ultrasonic wave, and an ultrasonic sensing portion which is expanded and contracted in accordance with the ultrasonic wave received by the receiving surface 20a. Since an optical reflectance of the ultrasonic sensing portion changes in correspondence with the expansion and contraction, the light entered into the ultrasonic detecting element 20 via the optical transmission path 13 and the collimating portion 14 is subjected to intensity modulation and then reflected. The light reflected from the ultrasonic detecting element 20 passes through the collimating portion 14 and the optical transmission path 13 again, goes through the beam separator 12 and enters into the photodetector 15 having plural pixels.

The photodetector 15 is a two dimensional photoelectric transducer including a PDA (photo diode array), MOS-type sensor or the like. The photodetector 15 detects the light, which comes from the corresponding position of the ultrasonic detecting element 20 via the beam separator 12, for each of the plural pixels and outputs detection signals corresponding to the light intensity on the respective pixels. Here, it may be adapted so that the reflected light enters into the photodetector 15 directly or via an optical fiber or the like. Alternatively, a focussing system 18 may be disposed behind the beam separator 12 so that the reflected light is focused on the photodetector 15 via the focussing system 18.

Figure 2:
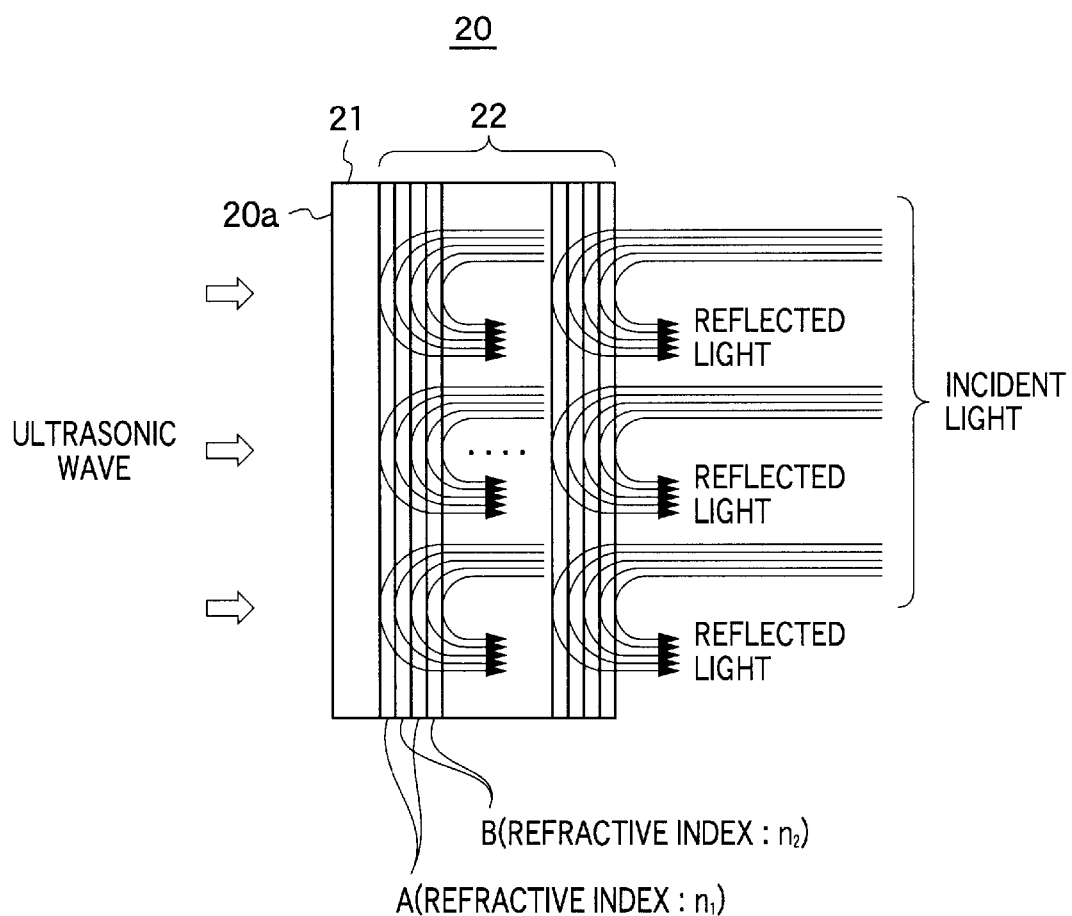
FIG. 2 is a diagram illustrating a principle of detecting ultrasonic waves by using an ultrasonic detecting element as shown in FIG. 1.

Next, referring to FIG. 2, the structure of the ultrasonic detecting element 20 and the detecting principle of the ultrasonic wave will be described in detail. The ultrasonic detecting element 20 is a multi-layered sensor including a substrate 21 and a multi-layered film 22 laminated on the substrate. This multi-layered film 22 serves as the ultrasonic sensing portion.

The substrate 21 is a film-like substrate that generates distortion by receiving ultrasonic wave and has, for example, a circular configuration of approximately 2 cm in diameter or more large area. Formed on the substrate 21 is a multi-layered film 22 having a Bragg grating structure. The multi-layered film 22 is formed by alternately laminating two material layers which have the refractive indexes different from each other. In FIG. 2, material layers A having a refractive index $n_1$ and material layers B having a refractive index $n_2$ are shown.

Assuming that a pitch (distance) of a periodical structure of the multi-layered film 22 is "d" and that the wavelength of the incident light is "λ", the reflection condition of Bragg is expressed by the following formula.

$$2d \cdot \sin\theta = m\lambda \tag{1}$$

Herein, "θ" denotes an angle formed between the incidence plane and the incident light and "m" is arbitrary integer number. Assuming that $\theta = \pi/2$, the following formula is held.

$$2d = m\lambda \tag{2}$$

Bragg grating selectively reflects the light having a specific wavelength, which meets the reflection conditions of Bragg, and transmits the light having other wavelength.

When the ultrasonic wave is propagated to the ultrasonic detecting element 20, the substrate 21 is distorted accompanying the propagation of the ultrasonic wave, and the pitch "d" of the periodical structure changes at the respective positions of the multi-layered film 22. Accompanying this, the wavelength "λ" of the selectively reflected light changes. In the reflection characteristics of Bragg grating, there is an inclined band, where the optical reflectance changes, in the vicinity of a central wavelength under which an optical reflectance is the highest (i.e., an optical transmittance is lowest). While allowing the light, which has a center wavelength within the range of the inclined band, to enter into the multi-layered film 22, an ultrasonic wave is applied to the substrate 21. Then, it is possible to observe changes in the intensity of the reflected light (or transmitted light) corresponding to the intensity of the ultrasonic wave at the respective points on the receiving surface. By converting the changes in the intensity of the light into the intensity of the ultrasonic wave, two-dimensional strength distribution information of the ultrasonic wave can be obtained. Herein, the term "reflection characteristics" means the relationship between the wavelength of the light and the reflection intensity in the ultrasonic detecting element 20.

As for the material of the substrate 21, optical glass such as silica glass ($SiO_2$), BK7 (a product of SCHOTT), or the like is used. As for the substances used for the material layers A and B, a combination of substances having refractive indexes differ by 10% or more from each other is preferred. For example, a combination of $SiO_2$ and titanium oxide ($Ti_2O_3$), a combination of $SiO_2$ and tantalum oxide ($Ta_2O_5$), or the like is mentioned. Material layers A and B are formed on the substrate 21 by means of vacuum deposition, sputtering or the like.

In order to reduce the multiple reflection of the ultrasonic wave, it is effective to elongate the distance through which the ultrasonic wave propagates. When the ultrasonic wave propagates, not a little of the ultrasonic wave attenuates. The longer propagation distance results in a larger attenuation amount. Therefore, by ensuring enough propagation distance, it is possible to attenuate the ultrasonic wave satisfactorily before a time point when an ultrasonic wave, which is propagated to one end, is reflected at the other end and returns to the one end. Accordingly, in the first embodiment, an optical fiber is used as the optical transmission path, and received ultrasonic wave is allowed to propagate through the optical fiber. That is, the optical transmission path has a function to pass the light therethrough and a function as the backing portion for attenuating the ultrasonic wave as well.

Figure 3:
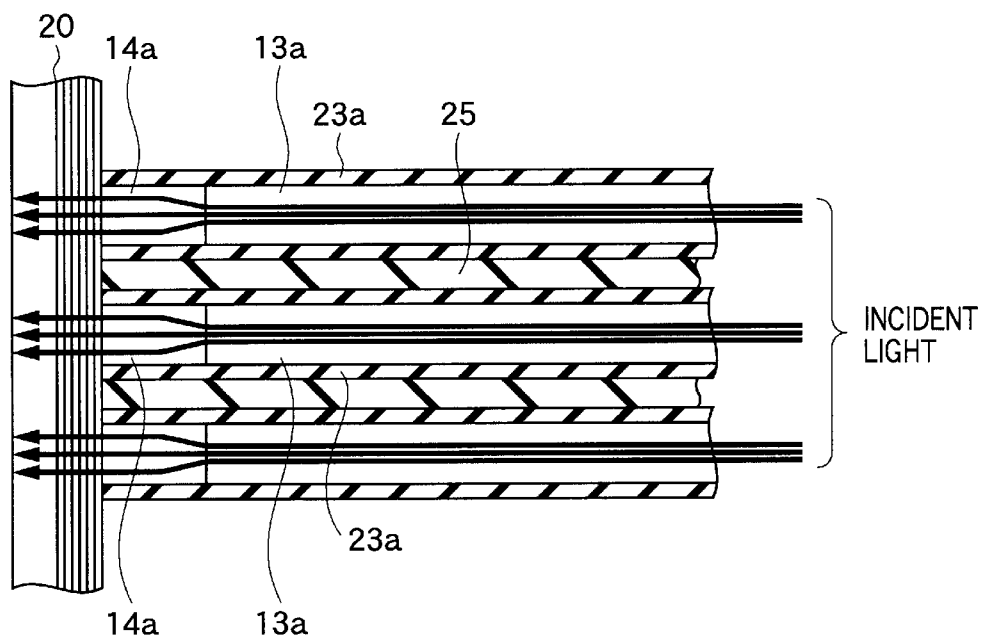
FIG. 3 is an expanded sectional view showing the ultrasonic detecting element, collimating portions and a connecting portion of optical transmission paths as shown in FIG. 1.

FIG. 3 is an expanded sectional view showing a part of optical transmission path 13, the collimating portion 14 and the ultrasonic detecting element 20 as shown in FIG. 1. As shown in FIG. 3, plural optical fibers 13a included in the optical transmission path (bundle fiber) 13 and plural collimator lenses 14a included in the collimating portion (collimator lens array) 14 are connected with optical axes thereof being aligned with each other. Further, plural collimator lenses 14a are disposed in a two-dimensional state and connected to the ultrasonic detecting element 20. The plurality of optical fibers 13a are bundled by using an adhesive agent 25.

The optical fiber 13a is, for example, a single mode or multi mode fiber of approximately 2 m in length and is covered with a member (covering material 23a) including a resinous material having a low viscosity. In order to attenuate the ultrasonic wave during the propagation through the optical fiber, propagation energy loss of the ultrasonic wave is further increased by covering the optical fiber with the above member, resulting in earlier ultrasonic wave attenuation.

The light transmitted in the optical fiber 13a is diffracted when the light outputs from the optical fiber. Due to this, in the case where the optical fiber 13a is connected directly to the ultrasonic detecting element 20, the light is diffused and the optical reflection characteristics of the ultrasonic detecting element is largely disturbed resulting in an unsatisfactory interference within the ultrasonic detecting element. As a result, detection sensitivity of the ultrasonic detecting element becomes largely decreased. In order to avoid this phenomenon, the collimator lens 14a is connected at one end of the optical fiber 13a to prevent the output light from being diffused. The collimating lens array including a plurality of collimator lenses 14a collimates the light guided by the respective optical fibers with respect to plural positions within an ultrasonic receiving plane of the ultrasonic detecting element 20.

As for the collimator lens 14a, a gradient index lens (hereinafter, abbreviated to GRIN lens) is used. The GRIN lens is known as, for example, the product name of Selfoc (registered trademark of NIPPON SHEET GLASS CO., LTD.) lens. The GRIN lens is a gradient refractive index type lens having a refractive index that differs depending on the position, and the optical characteristics thereof changes by changing the length. For example, when the GRIN lens is adapted so that the length thereof is ¼ of a distance between an object and an image (a pitch under which the light focuses electing image), incident light is output in parallel light.

In the first embodiment, Selfoc lens array NA0.46 (a product of NIPPON SHEET GLASS CO., LTD.), in which a number of Selfoc lenses are disposed, is used at a length of 0.25L (L: a distance between an object and an image), and each Selfoc lens as a collimator lens 14a is connected to the optical fiber.

As shown in FIG. 3, the collimator lenses 14a may be covered with a covering material 23a in order to allow the ultrasonic wave to attenuate earlier as same as the case of the optical fiber 13a.

The optical fiber and the collimator lens, or, the collimator lens and the ultrasonic detecting element are connected to each other by means of a fusion bond or an adhesive agent. In the case of using the adhesive agent, it is preferred to use a resinous adhesive agent including epoxy series adhesives. The reason is as follows. In the adhesive agent as described above, since the acoustic impedance thereof is close to that of the members of the optical fiber and the collimator lens and the substrate of the ultrasonic detecting element, it is possible to prevent the ultrasonic wave from being reflected at each boundary of the respective members during the propagation. Also, as for the adhesive agent 25 for bundling the plurality of optical fibers, it is preferred to use a resinous adhesive agent including epoxy series adhesives. Because such adhesive agent can attenuate the ultrasonic wave, prevent cross talk of the ultrasonic wave between the neighboring optical fibers, and maintain the flexibility as a cable. In the first embodiment, STYCAST (a product of Emerson & Cuming) is used as the adhesive agent.

According to the first embodiment, since the received ultrasonic wave is attenuated and disappeared while propagating through the optical fiber, it is possible to prevent the multiple reflection of the ultrasonic wave in the ultrasonic detecting element. Accordingly, the SN-ratio in the ultrasonic image is increased resulting in an increased image quality. Also, since the optical fibers and the ultrasonic detecting element are connected to each other through the Selfoc lenses of several millimeters or so in length, it is possible to miniaturize the ultrasonic receiving apparatus.

Figure 4:
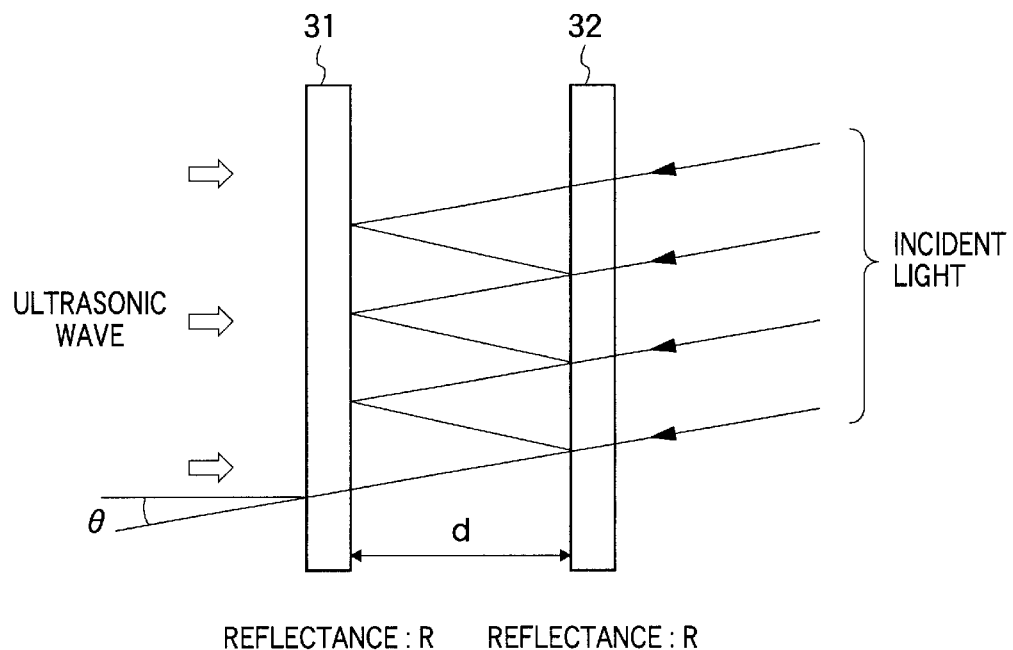
FIG. 4 is a diagram showing a modification of the ultrasonic receiving apparatus as shown in FIG. 1.

Referring to FIG. 4, an example of modification of the first embodiment will be described. In this example, in place of the ultrasonic detecting element 20 in FIG. 1, an ultrasonic detecting element (etalon sensor) 30 as shown in FIG. 4 is used. The constitution other than the above is the same as that described referring to FIGS. 1 and 3.

As shown in FIG. 4, the substrate 31 is a film-like substrate that is deformed by the ultrasonic wave. A substrate 32 is disposed facing to the substrate 31, and these substrates form a structure the same as an etalon.

Assuming that an optical reflectance of the substrates 31 and 32 is "R"; a distance between these substrates is "d", and a wavelength of the incident light is "λ", an optical transmittance of the etalon is expressed as following:

$$T=\{1+4R/(1-R)^2\cdot\sin^2(\phi/2)\}^{-1} \quad (3)$$

$$\phi=2\pi/\lambda\cdot 2nd\cdot\cos\theta \quad (4)$$

Herein, "θ" is an exit angle measured from the perpendicular line with respect to the exit plane, and "n" is an arbitrary integer number. Assuming that θ=0, the following formula is held.

$$\phi=4\pi nd/\lambda \quad (5)$$

The etalon transmits the light having wavelength "λ" at an optical transmittance T, and reflects the same at an optical reflectance R=(1−T).

When an ultrasonic wave is propagated to the ultrasonic detecting element 30, since the substrate 31 is distorted and the distance "d" between the substrates 31 and 32 is changed at the respective positions of the receiving surface, the reflection ratio with respect to the light having the wavelength "λ" changes. The reflection characteristics of the etalon periodically change with respect to the changes in wavelength. When the ultrasonic wave is applied while allowing the light, which has a center wavelength in an area where the change rate of the reflection characteristics is large, to enter into the substrate 31, it is possible to observe changes in the intensity of the reflected light corresponding to the intensity of the ultrasonic wave at the respective positions of the receiving surface. By converting the changes in the intensity of the reflected light into the intensity of the ultrasonic wave, the intensity of the ultrasonic wave can be measured in a two-dimensional manner.

Figure 5A:
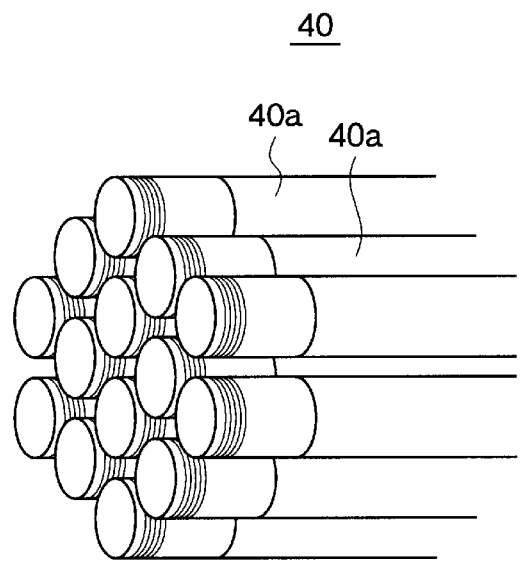
FIGS. 5A and 5B are diagrams showing a part of ultrasonic receiving apparatus according to a second embodiment of the present invention.

Next, referring to FIGS. 5A and 5B, an ultrasonic receiving apparatus according to a second embodiment of the present invention will be described below. In the second embodiment, in place of the ultrasonic detecting element 20, the optical transmission path 13 and the collimating portion 14 as shown in FIG. 1, a bundle fiber 40 having an ultrasonic sensing portion is used as shown in FIG. 5A. The constitution other than the above is the same as that of the first embodiment.

Figure 5B:
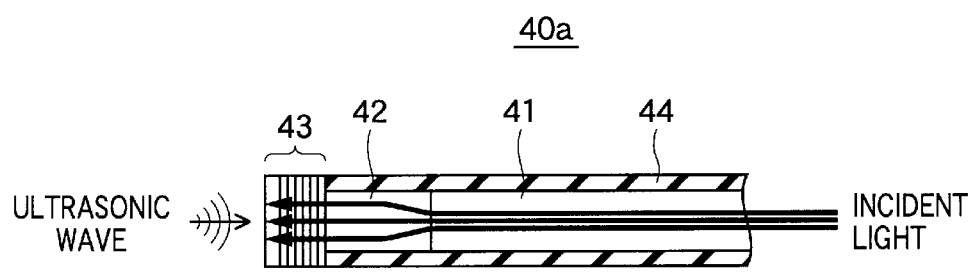

FIG. 5B shows a constitution of a fiber 40a included in the bundle fiber 40. The fiber 40a includes an optical fiber 41 and a collimator lens 42. In the second embodiment, a Selfoc lens of 0.25L in length is used as a collimator lens 42, same as the case of the first embodiment. Further, the both of the above are connected to each other by means of a fusion bond or a resinous adhesive agent including epoxy series adhesives.

Formed at one end of the collimator lens 42 is a multi-layered film 43 in which two different material layers are laminated alternately. The multi-layered film 43 constitutes a Bragg grating structure and serves as the ultrasonic sensing portion. As for the material for the multi-layered film 43, for example, a combination of $SiO_2$ and titanium oxide ($Ti_2O_3$), or a combination of $SiO_2$ and tantalum oxide ($Ta_2O_5$), or the like is used. The material layer as described above has been formed on the collimator lens 42 by means of vacuum deposition, sputtering or the like.

The fiber 40a is covered by a member (covering material 44) having a low viscosity so that the ultrasonic wave is attenuated before the ultrasonic wave, which is propagated to one end of the fiber 40a, is reflected at the other end thereof. Further, as shown in FIG. 5B, the covering material 44 may also cover the collimator lens 42. Owing to the fact, since the energy loss of the ultrasonic wave propagated to the fiber 40a can be made larger, an effect as a backing portion can be increased by allowing the ultrasonic wave to attenuate earlier.

By bundling a number of fibers 40a as described above using a resinous adhesive agent including epoxy series adhesives, the bundle fiber 40 having an ultrasonic sensing portion is manufactured.

According to the second embodiment, since the multi-layered film is formed directly on the collimator lens, the strength of the connecting portion between the collimator lens and the ultrasonic detecting element is increased. Further, since the reflection of the ultrasonic wave at the connecting portion is further reduced, the ultrasonic wave can be easily released into the fiber portion resulting in an effective prevention of the multiple reflection.

Next, referring to FIG. 6, an ultrasonic receiving apparatus according to a third embodiment of the present invention will be described below. The ultrasonic receiving apparatus as shown in FIG. 6 has a backing portion 50 in place of the optical transmission path 13 and the collimating portion 14 as shown in FIG. 1. The constitution other than the above is the same as that of the first embodiment.

The backing portion 50 includes an optical transmitting portion 51 that transmits the light used for detection and a cover portion 52 for attenuating the ultrasonic wave. As for the optical transmitting portion 51, a member such as an optical glass is used. As for the cover portion 52, a member such as resin, rubber or liquid, which has a low viscosity, is used. The backing portion 50 as described above and the ultrasonic detecting element 20 are connected to each other by means of a resinous adhesive agent such as an epoxy series adhesive or the like.

In the ultrasonic receiving apparatus in FIG. 6, the light generated by the light source 11 passes through a lens 16 and, after the direction thereof is changed by the beam separator 12, passes through a lens 17 and the optical transmitting portion 51 and then enters into the ultrasonic detecting element 20. In the ultrasonic detecting element 20, an optical reflectance of the portion that is expanded and contracted in accordance with the ultrasonic wave received on the receiving surface 20a is changed. Owing to the fact, the light entered into the ultrasonic detecting element 20 is reflected after being subjected to intensity modulation. Further, reflected light passes through the lens 17, the beam separator 12 and the focussing system 18, and enters into the photodetector 15, which detects the reflected light.

On the other hand, the ultrasonic wave applied to the ultrasonic detecting element 20 propagates into the inside of the ultrasonic detecting element 20 and the backing portion 50. In the backing portion 50, since the ultrasonic wave loses the energy while propagating through the optical transmitting portion 51 and the energy is absorbed by the cover portion 52, the ultrasonic wave attenuates rapidly. Owing to the fact, the influence due to the multiple reflection of the ultrasonic wave can be reduced.

According to the third embodiment, different from the case where the light is guided to the ultrasonic detecting element by means of the plural optical fibers corresponding to the respective pixels, the light having a predetermined thickness (irradiation area) is guided to the reflection surface of the ultrasonic detecting element, and therefore, the constitution of the ultrasonic receiving apparatus can be simplified. In the third embodiment, although the light, which has passed through the lens 17 as shown in FIG. 6, is guided directly to the optical transmitting portion, it may be adapted so that the light enters into the optical transmitting portion via an optical fiber and a collimating portion as shown in FIG. 1. Further, between the optical transmitting portion 51 and the ultrasonic detecting element 20, a collimating portion may be interposed to make the light output from the optical transmitting portion 51 into parallel light and to allow the light to enter into the ultrasonic detecting element 20. Furthermore, in the third embodiment, although a multi-layered film sensor as shown in FIG. 2 is used as an ultrasonic detecting element, an etalon sensor as shown in FIG. 4 may be used.

In the above-described first to third embodiments, the ultrasonic wave sensing performance can be increased by adding a light amplifier. Referring to the FIG. 7, this modification will be described below.

Figure 7:
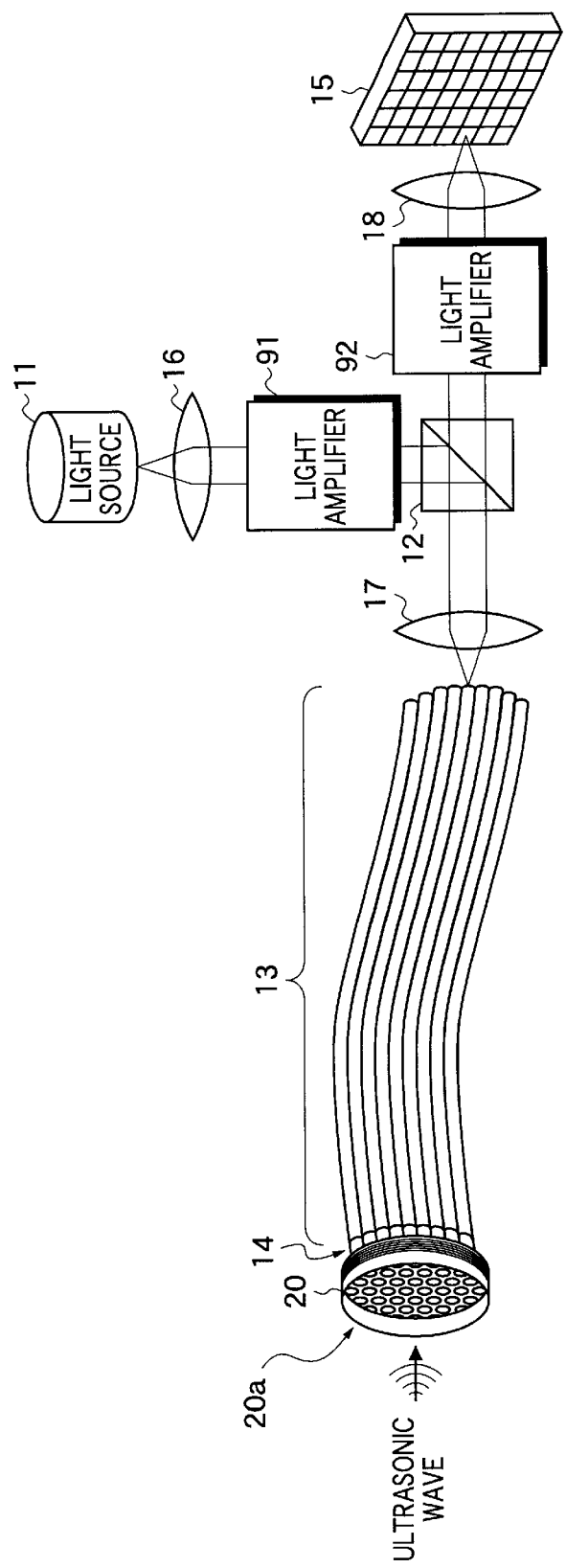
FIG. 7 is a diagram showing a modification of the ultrasonic receiving apparatus according to the first to third embodiments of the present invention.

In an ultrasonic receiving apparatus as shown in FIG. 7, at least one of the light amplifier 91 and the light amplifier 92 is added to the ultrasonic receiving apparatus as shown in FIG. 1. The light amplifier 91 is disposed between the light source 11 and the beam separator 12, or, between the lens 16 and the beam separator 12. The light amplifier 91 amplifies the light entered from the light source 11, and outputs the amplified light to the beam separator 12. On the other hand, the light amplifier 92 is disposed between the beam separator 12 and the focussing system 18. The light amplifier 92 amplifies the light entered from the beam separator 12, and outputs the amplified light to the focussing system 18. In the case where the focussing system 18 is not used, the light amplifier 92 is disposed between the beam separator 12 and the photodetector 15, amplifies the light entered from the beam separator 12, and outputs the amplified light to the photodetector 15.

As for the light amplifier, for example, an optical fiber amplifier doped with Erbium (Er), that is, EDFA (Er-doped optical fiber amplifier) is used. The EDFA is capable of increasing the intensity of the light by approximately one to two orders.

When the light amplifier as described above is disposed between the light source 11 and the ultrasonic detecting element 20, the intensity of the incident light entering into the ultra sonic detecting element 20 is amplified. Also, when the light amplifier is disposed between the ultrasonic detecting element 20 and the photodetector 15, although the intensity of the incident light entering into the ultrasonic detecting element 20 is not changed, the intensity of the reflected light that enters into the photodetector 15 is amplified. In this case, the changes in the intensity of the reflected light that has been modulated by the received ultrasonic wave are also amplified.

In any case, by amplifying the intensity in the state of the light, the amount of light of the reflected light that enters into the photodetector 15 is increased. Accordingly, the influence of electrical noise in the photodetector 15 is reduced resulting in an increased SN-ratio of the ultrasonic receiving apparatus. Further, in the case where the both of the above-mentioned light amplifiers are used simultaneously, the SN-ratio can be more increased.

Figure 8:
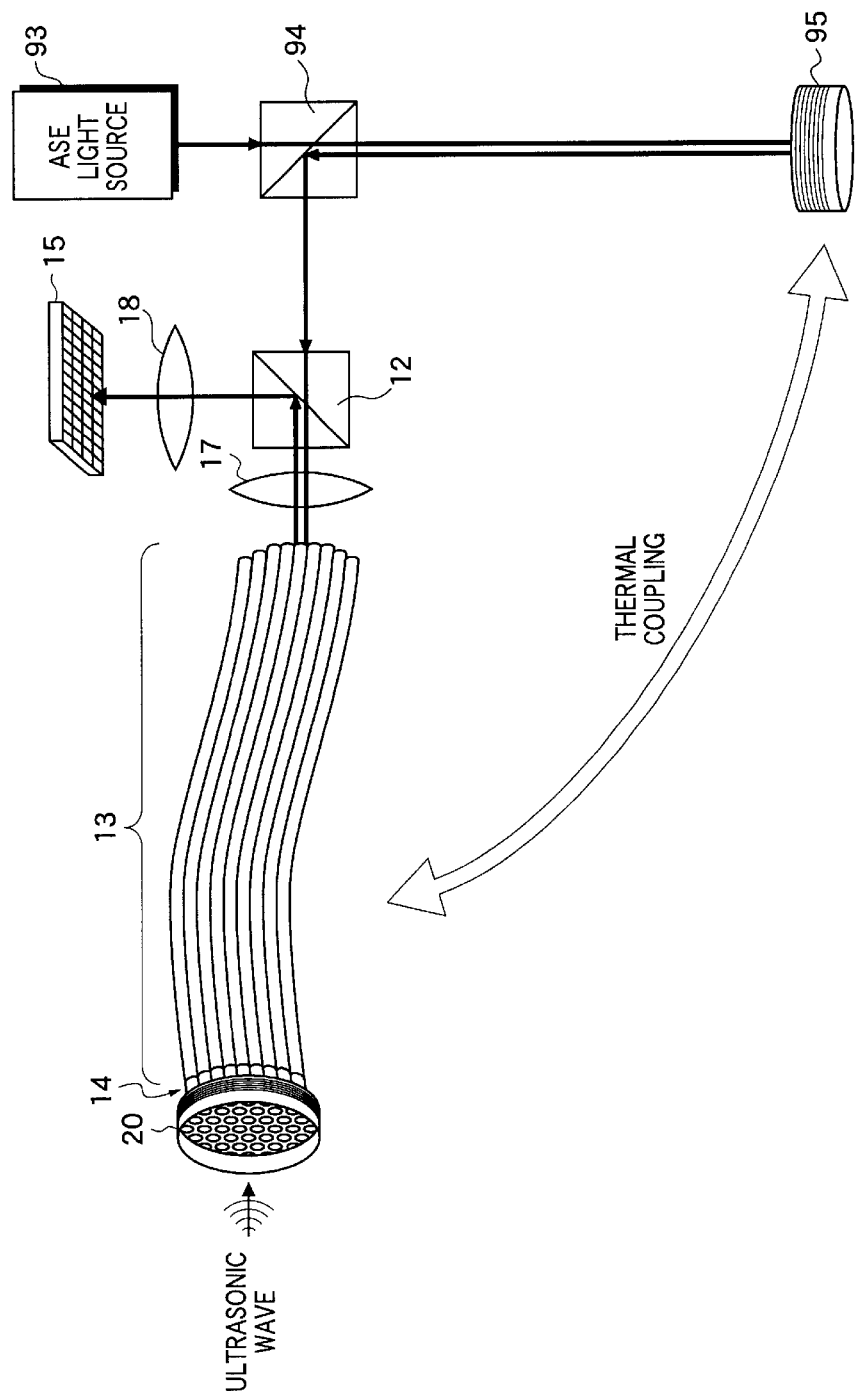
FIG. 8 is a diagram showing another modification of the ultrasonic receiving apparatus according to the first to third embodiments of the present invention.
Figure 9:
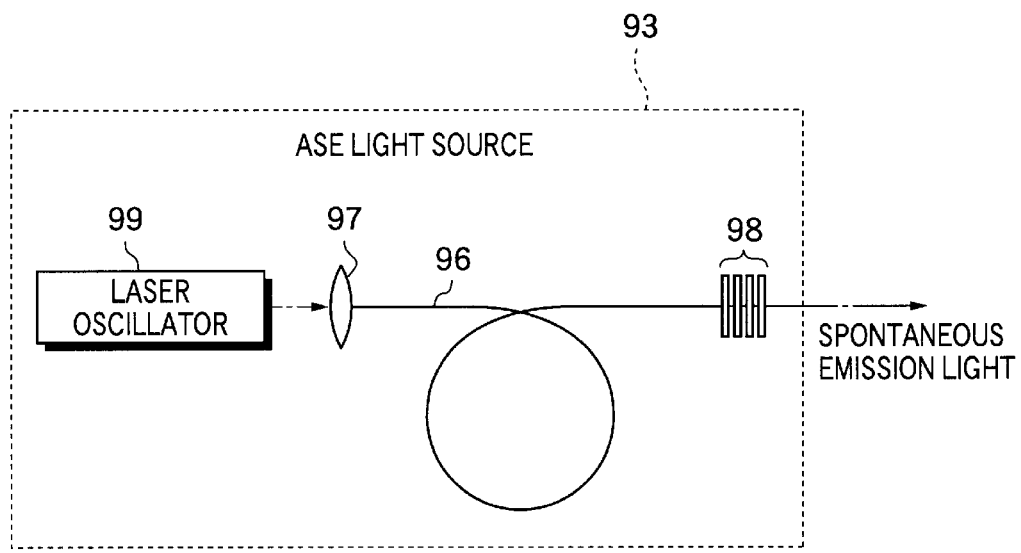
FIG. 9 is a diagram showing a constitution of an ASE light source as shown in FIG. 8.

In the first to third embodiments, a broadband light source may be used as the light source in place of the tunable LD. Referring to FIGS. 8 and 9, this modification will be described.

In FIG. 8, the light generated by the broadband light source is narrow-banded by using a narrow-band-pass filter. As for the broadband light source, for example, an ASE (amplified spontaneous emission) light source, which emits amplified spontaneous emission light, or a broadband fiber light source may be used. In FIG. 8, as the broadband light source, an ASE light source 93 is used. In the ASE light source 93, the structure of a broadband optical fiber amplifier is modified so as to generate amplified spontaneous emission light. As for detailed information concerning the broadband optical fiber amplifier, for example, refer to "Broadband Light Amplifiers" by Haruki OGOSHI (The Journal of The Institute of Electronics, Information and Communication Engineers, Vol. 82, No. 7, p. 718–724, July, 1999).

FIG. 9 is a diagram illustrating the principle of the ASE light source 93 as shown in FIG. 8. The ASE light source 93 includes an optical fiber 96 for amplifying the light. A lens 97 is attached on one end of the optical fiber 96, and a Bragg grating portion 98 for reflecting excitation light is formed on the other end thereof. On the left side of the lens 97 in FIG. 9, a laser oscillator 99 as an excitation light source is disposed. The light generated by the laser oscillator 99 enters into the optical fiber 96 via the lens 97 and is amplified, and a part of the amplified light passes through Bragg grating portion 98 as spontaneous emission light.

Referring to FIG. 8 again, the light generated by the ASE light source 93 enters into the beam separator 94. The beam separator 94 allows the light entered from a first direction to pass in a second direction, and allows the reflected light returning from the second direction to pass in a third direction which is different from the first direction. In FIG. 8, although a half mirror is used as the beam separator 94, a light circulator or a polarizing beam splitter may be used.

A narrow-band-pass filter 95, which is constituted with the same material as that of the ultrasonic detecting element 20, is disposed in the direction in which the light output from the ASE light source 93 passes through the beam separator 94 (lower part in FIG. 8). The light entered into the narrow-band-pass filter 95 is reflected at a multi-layered film, which is included in the narrow-band-pass filter 95 and has a Bragg grating structure, and enters into the beam separator 94 again. The spontaneous emission light generated by the ASE light source 93 is narrow-banded by passing through the narrow-band-pass filter 95.

The light reflected from the narrow-band-pass filter 95 enters into the beam separator 94 again, the course thereof is changed and the light enters into the beam separator 12. The light passed through the beam separator 12 enters into the ultrasonic detecting element 20 in which an optical reflectance of the ultrasonic sensing portion changes by extension and contraction in accordance with the received ultrasonic wave, and is reflected after being subjected to an intensity modulation.

In Bragg grating portion, the central wavelength of the reflected light changes in the ratio of 0.01 nm/° C. due to temperature change. Accordingly, when a light source generating a single-wavelength laser beam is used, the following problem occurs, that is, the sensitivity of the ultrasonic detecting element 20 including Bragg grating portion largely changes due to the temperature change. However, as shown in FIG. 8, by narrow-banding the spontaneous emission light generated by the ASE light source 93 by using the narrow-band-pass filter 95, a band that is close to the single-wavelength laser beam can be ensured, and the changes in sensitivity of the ultrasonic receiving apparatus due to the temperature changes can be reduced as well.

Because the narrow-band-pass filter 95 and the ultrasonic detecting element 20 are formed using the same material and, for example, the narrow-band-pass filter 95 and the ultrasonic detecting element 20 are coupled using a material having a high heat conductivity, or the narrow-band-pass filter 95 and the ultrasonic detecting element 20 are positioned physically close to each other, thereby thermal coupling is ensured. Alternatively, a heat pipe may be disposed around the narrow-band-pass filter 95 and the ultrasonic detecting element 20.

Owing to the fact, Bragg grating portion of the narrow-band-pass filter 95 and Bragg grating portion of the ultrasonic detecting element 20 have substantially the same temperature. Accordingly, even when the reflection characteristics of the ultrasonic detecting element 20 shifts due to temperature fluctuation, the wavelength of the light that enters into the ultrasonic detecting element 20 also shifts. As a result, the changes in the sensitivity of the ultrasonic receiving apparatus can be reduced.

Figure 10:
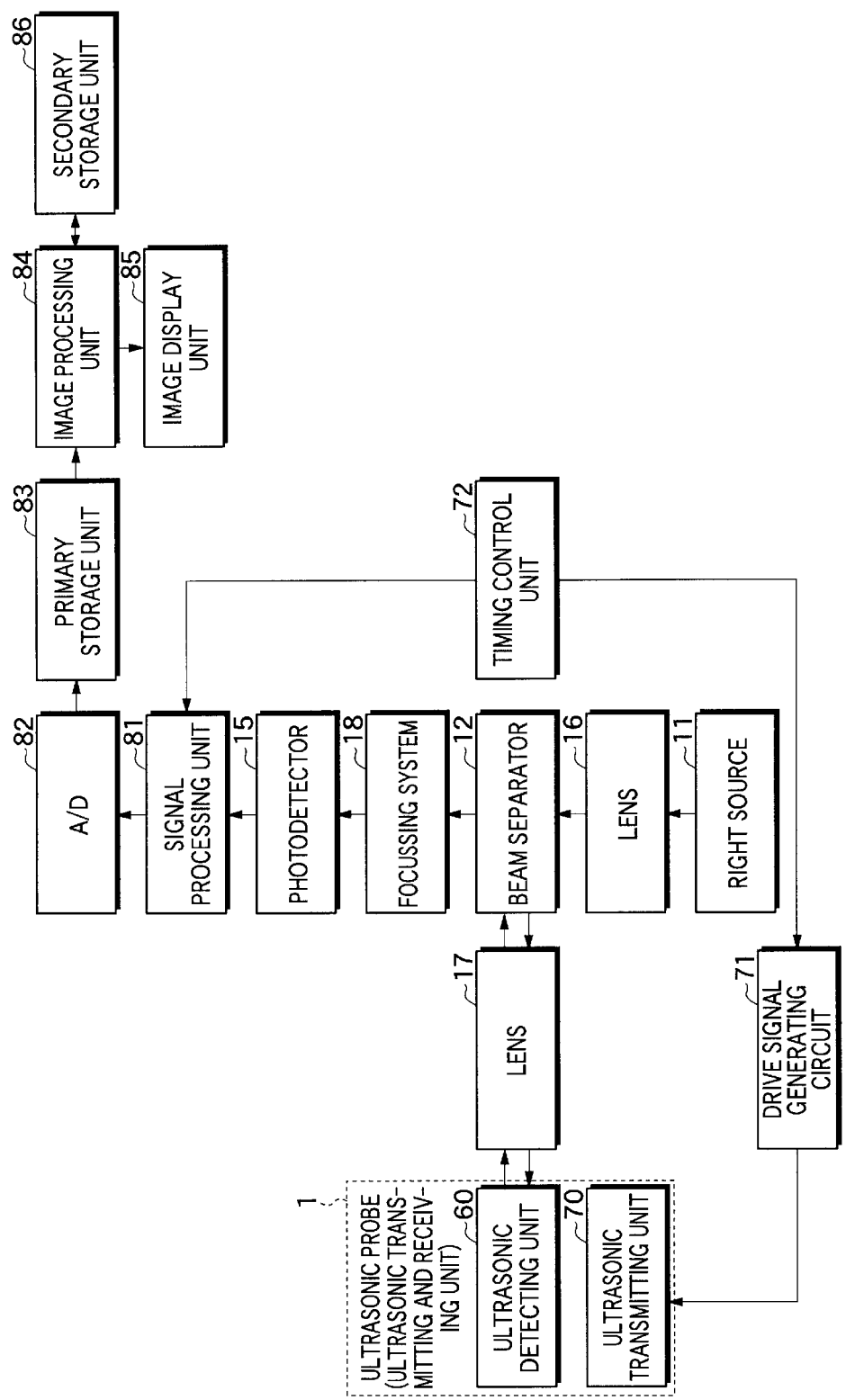
FIG. 10 is a block diagram showing an ultrasonic imaging apparatus to which the ultrasonic receiving apparatus according to the present invention is applied.

Referring to FIG. 10, an ultrasonic imaging apparatus, to which the above-described ultrasonic receiving apparatus is applied, will be described.

An ultrasonic detecting unit 60 as shown in FIG. 10 includes the ultrasonic detecting element which is described in the first to third embodiments and which is connected to the lens 17 and the beam separator 12 through the collimating portion or the optical transmission path.

Also, the ultrasonic imaging apparatus includes an ultrasonic transmitting unit 70 and a drive signal generating circuit 71. The ultrasonic transmitting unit 70 transmits an ultrasonic wave on the basis of a drive signal generated by the drive signal generating circuit 71.

The ultrasonic wave transmitted from the ultrasonic transmitting unit 70 is reflected by an object to be inspected and is received by the ultrasonic detecting unit 60. At his time, the ultrasonic sensing portion of the ultrasonic detecting unit 60 is expanded and contracted in accordance with the applied ultrasonic wave, and the optical reflectance of the ultrasonic sensing portion changes in accordance with the expansion and contraction. On the other hand, the light generated by the light source and has passed through the beam separator 12 enters into the ultrasonic detecting unit 60. The light is subjected to an intensity modulation owing to the optical reflectance changes in the ultrasonic sensing portion of the ultrasonic detecting unit 60, and reflected. The reflected light enters into the photodetector 15 via the beam separator 12 and the focussing system 18, and is detected in a two-dimensional manner.

Further, the ultrasonic imaging apparatus includes a signal processing unit 81, an A/D converter 82, a primary storage unit 83, an image processing unit 84, an image display unit 85, a secondary storage unit 86 and a timing control unit 72.

A detection signal output from the photodetector 15 is subjected to processing such as phase adjustment, logarithmic amplification, demodulation and so on in the signal processing unit 81, and further, is converted into a digital signal in the A/D converter 82.

The primary storage unit 83 stores a plurality of plane data based on converted data. The image processing unit 84 reconstitutes a two-dimensional data or three-dimensional data based on these data, and carries out processing such as interpolation, response modulation processing, tone processing and so on. The image display unit 85 is, for example, a display apparatus such as a CRT or an LCD, and displays images based on these processed image data. Further, the secondary storage unit 86 stores data processed by the image processing unit 84.

The timing control unit 72 controls the drive signal generating circuit 71 to generate a drive signal at a predetermined timing, and controls the signal processing unit 81 to take in a detection signal output from the photodetector 15 after a predetermined time has passed from a time point of transmission. Thus, it is possible to detect an ultrasonic wave reflected from a specific depth of the object.

Here, the ultrasonic detecting unit 60 and the ultrasonic transmitting unit 70 may be disposed separately, or by integrating the ultrasonic transmitting unit 70 and the ultrasonic detecting element, an ultrasonic probe (ultrasonic transmitting and receiving unit) 1 may be composed.

Figure 11:
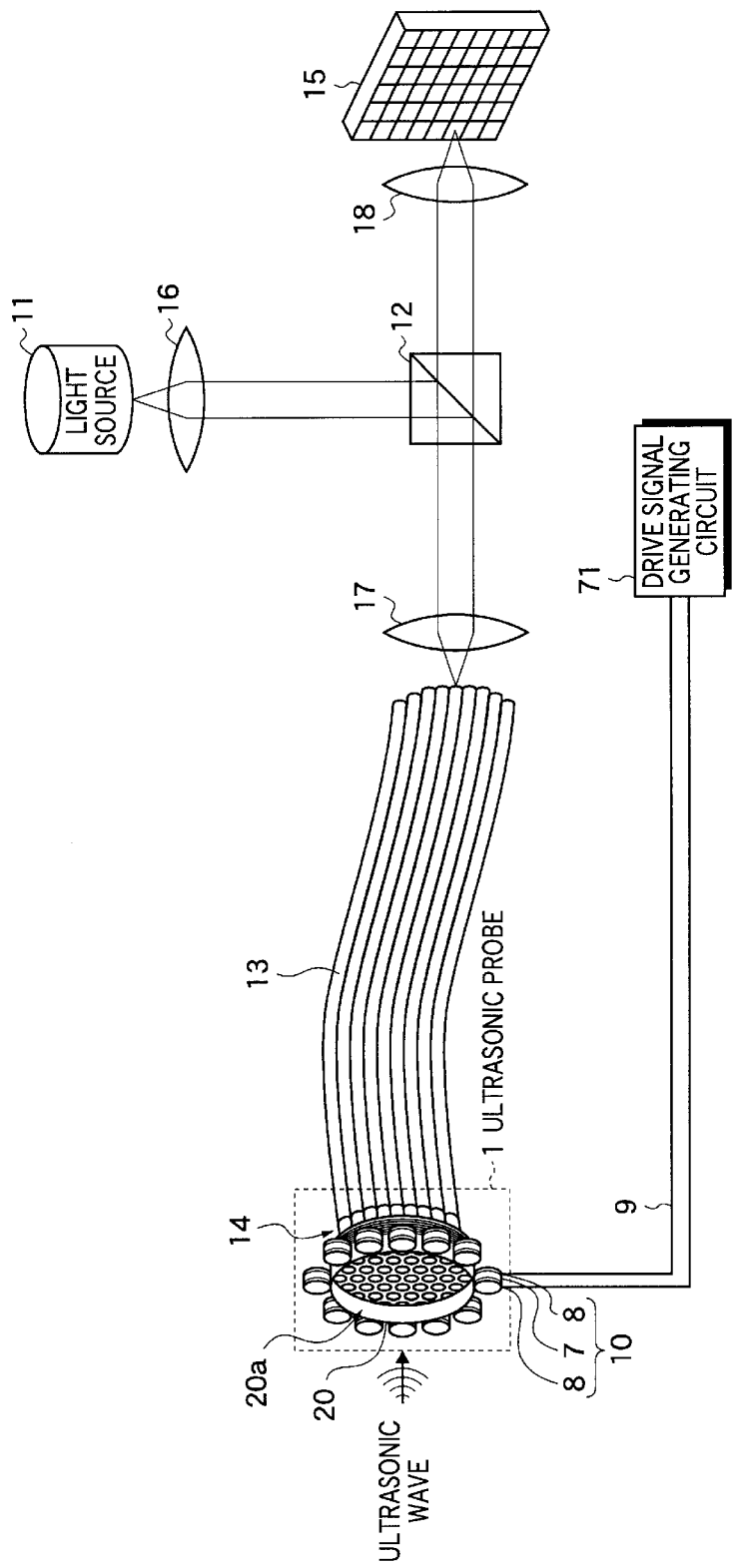
FIG. 11 is a schematic diagram showing an ultrasonic probe included in the ultrasonic imaging apparatus in FIG. 10.
Figure 12:
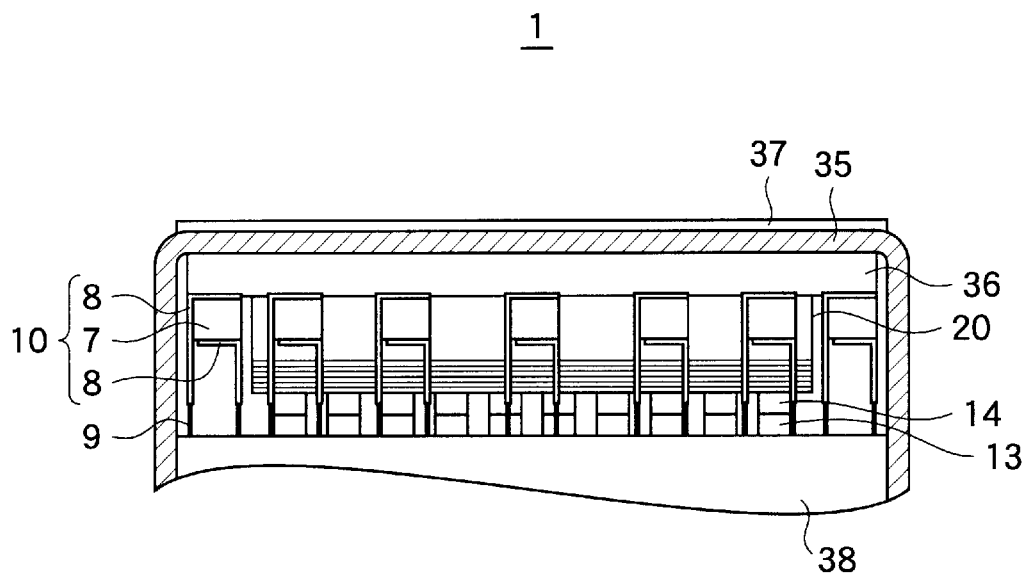
FIG. 12 is a front elevation showing a structure of the ultrasonic probe as shown in FIG. 11.

Referring to FIGS. 11 and 12, the constitution of the ultrasonic probe, in which the ultrasonic transmitting unit 70 and the ultrasonic detecting element are integrated, will be described.

In an ultrasonic probe 1 as shown in FIG. 11, plural ultrasonic transmitting elements 10 are disposed on the periphery of the ultrasonic detecting element 20. Each ultrasonic transmitting element 10 includes a piezoelectric element 7 and electrodes 8, and is connected to the drive signal generating circuit 71 via a wiring 9. In FIG. 11, only one pair of wirings are shown for the purpose of simplicity.

The piezoelectric element 7 is constituted of a piezoelectric ceramic represented by PZT (Pb (lead) zirconate titanate) or macromolecule piezoelectric element such as PVDF (polyvinyl difluoride) or the like. When a voltage is applied to the piezoelectric element as described above by transmitting a pulse-like electric signal or a continuous-wave electric signal from the drive signal generating circuit 71, the piezoelectric element expands and contracts owing to the piezoelectric effect. Thereby an ultrasonic pulse or a continuous ultrasonic wave is generated and propagates through a medium as an ultrasonic beam.

FIG. 12 is a front elevation showing the inside of the housing of the ultrasonic probe 1. Within a housing 35 of the ultrasonic probe 1, ultrasonic transmitting elements 10 including the piezoelectric elements 7 and the electrodes 8, and an ultrasonic detecting element 20 connected to the optical transmitting portion 13 via the collimating portion 14 are contained.

It is preferred to provide an acoustic-matching layer 36 between the ultrasonic transmitting elements 10 and the ultrasonic detecting element 20 and the housing 35 to ensure the matching of the acoustic impedance. The acoustic matching layer 36 may be constituted of a PYREX (registered trademark of Pyrex corporation) glass, an epoxy resin containing metal powder or the like, which transmits ultrasonic wave easily. Further, it is preferred in order to provide an acoustic lens member 37 of a silicon rubber or the like on the surface of the housing 35, with the purpose combined with the protection of the ultrasonic transmitting element 10 and the ultrasonic detecting element 20. The inside of the housing 35 is fixed with a resin 38 excluding the adjacency where the ultrasonic transmitting elements 10 and the ultrasonic detecting element 20 are disposed.

Figure 13A:
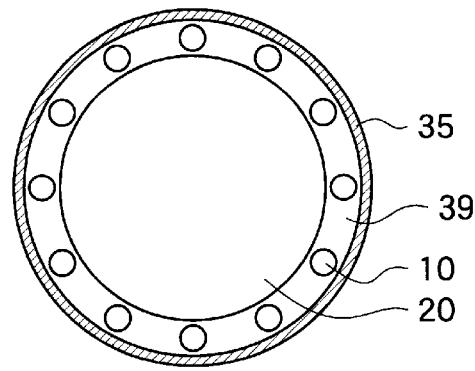
FIGS. 13A to 13C are views showing layout examples of ultrasonic detecting element and ultrasonic transmitting element.
Figure 13B:
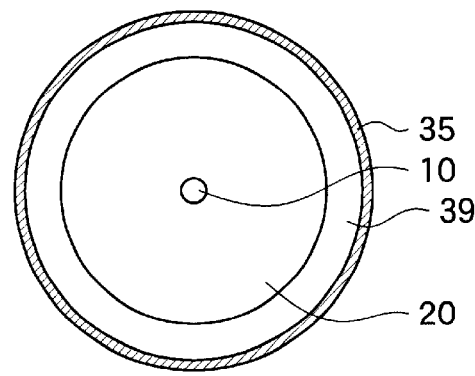
Figure 13C:
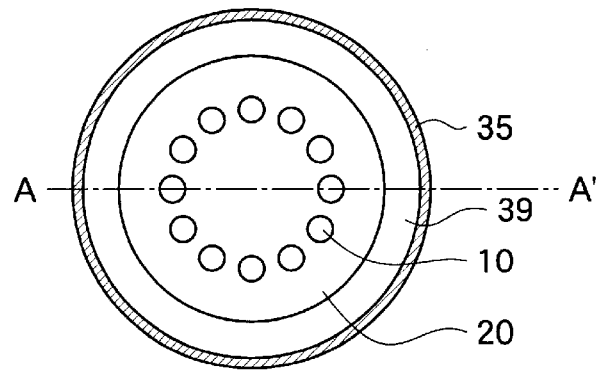

FIGS. 13A to 13C are plan views showing an ultrasonic probe 1 respectively. According to this embodiment of the present invention, as shown in FIG. 13A, plural ultrasonic transmitting elements 10 are disposed around the ultrasonic detecting element 20. However, as shown in FIG. 13B or 13C, it is possible to arrange so that the receiving surfaces of the ultrasonic detecting element 20 surround one or plural ultrasonic transmitting elements 10. When one ultrasonic transmitting element 10 is disposed at the center of the ultrasonic detecting element 20 as shown in FIG. 13B, beam scanning of the transmission wave is not available, and therefore, it is preferred to use a non-directional ultrasonic transmitting element. On the other hand, as shown in FIG. 13A or 13C, when plural ultrasonic transmitting elements 10 are disposed in a one-dimensional or two-dimensional manner, one-dimensional or two-dimensional beam scan transmission is possible. In FIGS. 13A to 13C, the periphery of the ultrasonic transmitting elements 10 and ultrasonic detecting element 20 may be filled with a sound absorbing material 39 in order to reduce the cross talk of the ultrasonic wave. As for the sound absorbing material 39, an epoxy resin containing metal powder, rubber containing ferrite powder or the like is suitable.

In the case where the ultrasonic transmitting elements 10 and the ultrasonic detecting element 20 are disposed as shown in FIG. 13C, the ultrasonic probe may be manufactured, for example, in a manner as described below. FIGS. 14A to 14D are diagrams illustrating an example of manufacturing method of the ultrasonic probe.

Figure 14A:
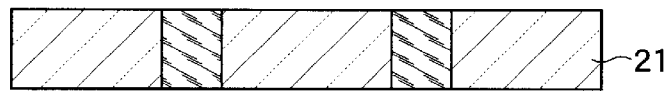
FIGS. 14A to 14D are views showing an example of manufacturing method of the ultrasonic probe in which the ultrasonic detecting element is disposed surrounding the ultrasonic transmitting elements.
Figure 14B:
Figure 14C:
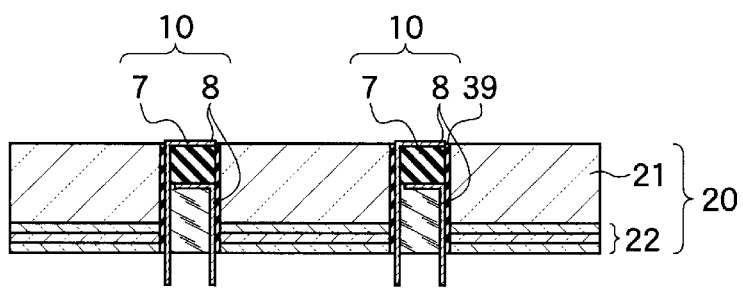
Figure 14D:
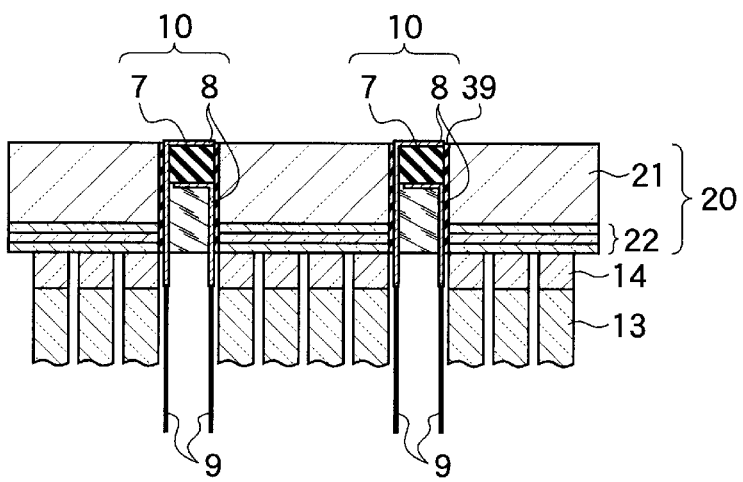
Figure 15:
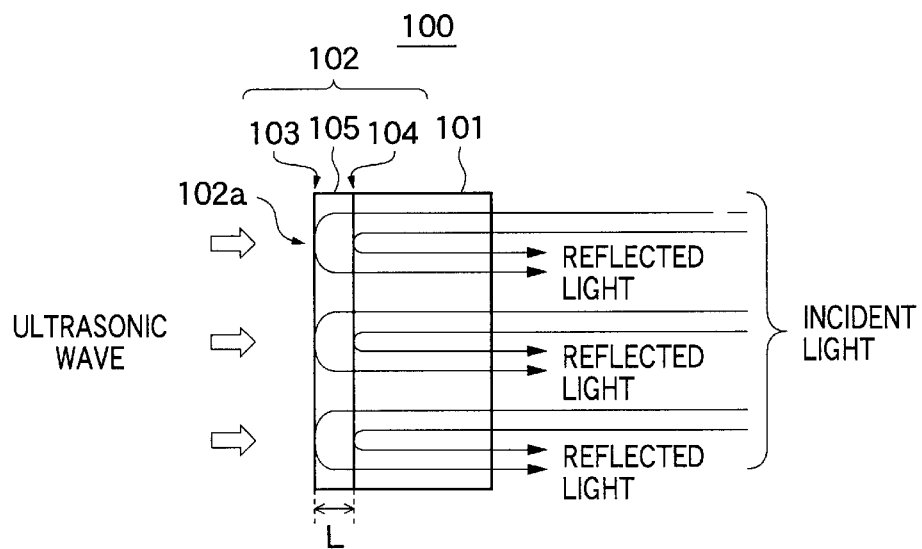
FIG. 15 is a diagram illustrating multiple reflection of the ultrasonic wave in a photo-detection type ultrasonic detecting element.
Figure 16:
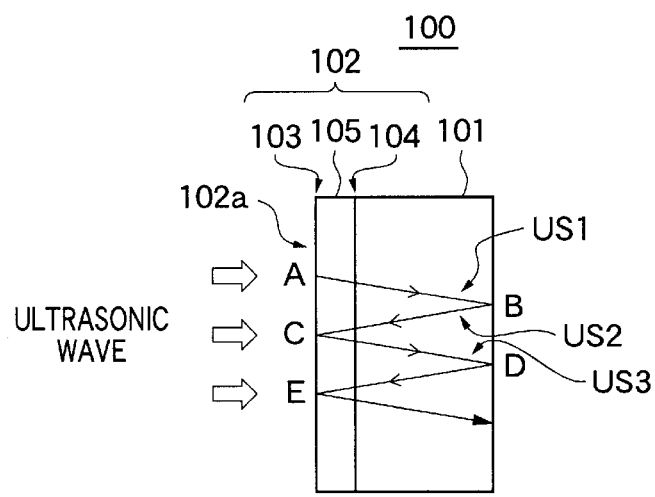
FIG. 16 is a diagram showing waveforms representing vibration generated at the points A to E in the ultrasonic detecting element.
Figure 17A:
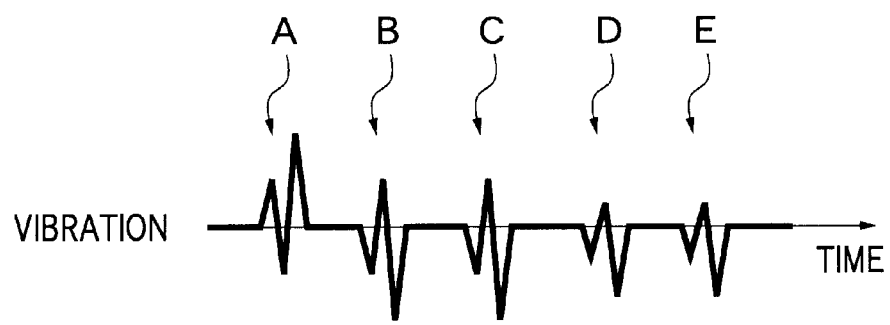
FIGS. 17A and 17B are diagrams showing waveforms representing detection signals detected by the ultrasonic detecting element at the points A, C and E.
Figure 17B:
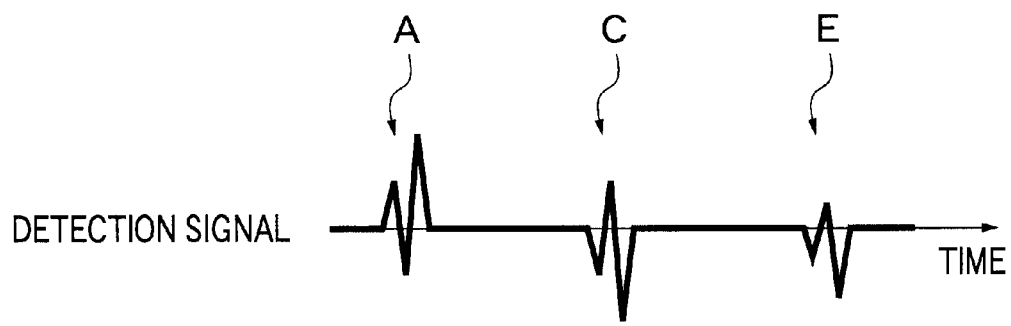

FIGS. 14A to 14D show a cross-sectional surface taken along the line A–A' in FIG. 13C. First of all, as shown in FIG. 14A, plural openings are formed on a substrate 21 using a material of an optical glass or the like. Next, as shown in FIG. 14B, a multi-layered film 22 having a Bragg grating structure is formed by laminating the layers of two kinds of materials, which have different refractive indexes, alternately on the bottom surface of the substrate 21 as shown in FIG. 14B. Next, as shown in FIG. 14C, an ultrasonic transmitting element 10 including the piezoelectric element 7 and the electrodes 8 respectively are inserted into the openings of the substrate 21. Thereby the receiving surface of the ultrasonic detecting element 20 is formed so as to surround the ultrasonic transmitting elements 10. At this time, the gaps between the ultrasonic transmitting elements 10 and the ultrasonic detecting element 20 may be filled with a sound absorbing material 39, an adhesive agent of epoxy series or the like. Further, as shown in FIG. 14D, the wiring 9 is connected to the ultrasonic transmitting element 10, and then, the collimating portion 14 and the optical transmission path 13 are connected to the ultrasonic detecting element 20.

As described above, by integrating the ultrasonic transmitting unit and the ultrasonic detecting unit, which use different methods from each other, into one probe, ultrasonic diagnosis can be carried out with the same operation feeling as the conventional probe in which the same method is used for transmission and reception.

According to the present invention, the multiple reflection of the ultrasonic wave can be reduced by making the received ultrasonic wave propagate to the optical transmission path. As a result, signals having a high SN-ratio and ultrasonic images with a satisfactory image quality can be obtained.

What is claimed is:

1. An ultrasonic receiving apparatus comprising:
   an ultrasonic detecting element for modulating light on the basis of a received ultrasonic wave;
   a backing portion directly or indirectly connected to said ultrasonic detecting element, for propagating the ultrasonic wave received by said ultrasonic detecting element, said backing portion having optical transmissibility and guiding the light used for detecting the ultrasonic wave; and
   a photoelectric conversion unit for detecting the light output from said ultrasonic detecting element.

2. The ultrasonic receiving apparatus according to claim 1, wherein:
   said ultrasonic detecting element includes an ultrasonic sensing portion which is expanded and contracted by a received ultrasonic wave to change an optical reflectance in accordance with expansion and contraction thereby performing intensity modulation of incident light; and
   said photoelectric conversion unit detects the light subjected to the intensity modulation at said ultrasonic detecting element.

3. The ultrasonic receiving apparatus according to claim 1, wherein said backing portion includes a member for attenuating the ultrasonic wave.

4. The ultrasonic receiving apparatus according to claim 2, wherein said backing portion includes a member for attenuating the ultrasonic wave.

5. An ultrasonic receiving apparatus comprising:
   an ultrasonic detecting element including an ultrasonic sensing portion which is expanded and contracted by a received ultrasonic wave to change an optical reflectance in accordance with expansion and contraction thereby performing intensity modulation of incident light;
   an optical transmission path for guiding the light to said ultrasonic detecting element and propagating the ultrasonic wave received by said ultrasonic detecting element;
   a collimating portion for collimating the light guided by said optical transmission path with respect to said ultrasonic detecting element; and
   a photoelectric conversion unit for detecting the light reflected from said ultrasonic detecting element.

6. The ultrasonic receiving apparatus according to claim 5, wherein at least one of said optical transmission path and collimating portion includes a member having an optical transmissibility and for attenuating the ultrasonic wave.

7. The ultrasonic receiving apparatus according to claim 5, wherein at least one of said optical transmission path and collimating portion is covered with a member for attenuating the ultrasonic wave.

8. The ultrasonic receiving apparatus according to claim 5, wherein said ultrasonic detecting element and said collimating portion are connected to each other by using one of a fusion bond and an adhesive agent.

9. The ultrasonic receiving apparatus according to claim 5, wherein said collimating portion and said optical transmission path are connected to each other by using one of a fusion bond and an adhesive agent.

10. The ultrasonic receiving apparatus according to claim 5, wherein said ultrasonic detecting element is formed directly on said collimating portion and said collimating portion is connected to said optical transmission path by using one of a fusion bond and an adhesive agent.

11. The ultrasonic receiving apparatus according to claim 10, wherein said ultrasonic detecting element is formed on said collimating portion by using one of vacuum deposition and sputtering.

12. The ultrasonic receiving apparatus according to claim 5, wherein said collimating portion changes the light incident from said optical transmission path into parallel light to output the parallel light toward said ultrasonic detecting element in accordance with a gradient of an refraction index in said collimating portion.

13. The ultrasonic receiving apparatus according to claim 5, wherein said collimating portion includes a collimating lens array for collimating the light guided by said optical transmission path with respect to plural positions within an ultrasonic receiving plane of said ultrasonic detecting element.

14. An ultrasonic imaging apparatus comprising:
   an ultrasonic transmitting unit for transmitting an ultrasonic wave in accordance with a drive signal;
   a drive signal generating circuit for generating the drive signal to be applied to said ultrasonic transmitting unit;
   an ultrasonic detecting element for modulating light on the basis of a received ultrasonic wave;

a backing portion, directly or indirectly connected to said ultrasonic detecting element, for propagating the ultrasonic wave received by said ultrasonic detecting element, said backing portion having optical transmissibility and guiding the light used for detecting the ultrasonic wave; and a photoelectric conversion unit for detecting the light output from said ultrasonic detecting element.

15. The ultrasonic imaging apparatus according to claim 14, wherein:

said ultrasonic detecting element includes an ultrasonic sensing portion which is expanded and contracted by a received ultrasonic wave to change an optical reflectance in accordance with expansion and contraction thereby performing intensity modulation of incident light; and said photoelectric conversion unit detects the light subjected to the intensity modulation at said ultrasonic detecting element.

16. The ultrasonic imaging apparatus according to claim 14, wherein said ultrasonic transmitting unit and said ultrasonic detecting element constitutes an ultrasonic probe.

17. The ultrasonic imaging apparatus according to claim 15, wherein said ultrasonic transmitting unit and said ultrasonic detecting element constitutes an ultrasonic probe.

18. An ultrasonic imaging apparatus comprising:

an ultrasonic transmitting unit for transmitting an ultrasonic wave in accordance with a drive signal;

a drive signal generating circuit for generating the drive signal to be applied to said ultrasonic transmitting unit;

an ultrasonic detecting element including an ultrasonic sensing portion which is expanded and contracted by a received ultrasonic wave to change an optical reflectance in accordance with expansion and contraction thereby performing intensity modulation of incident light;

an optical transmission path for guiding the light to said ultrasonic detecting element and propagating the ultrasonic wave received by said ultrasonic detecting element;

a collimating portion for collimating the light guided by said optical transmission path with respect to said ultrasonic detecting element; and a photoelectric conversion unit for detecting the light reflected from said ultrasonic detecting element.

19. The ultrasonic imaging apparatus according to claim 18, wherein said ultrasonic transmitting unit and said ultrasonic detecting element constitutes an ultrasonic probe.

* * * * *